US012554675B2

(12) United States Patent
Mirhoseini et al.

(10) Patent No.: US 12,554,675 B2
(45) Date of Patent: Feb. 17, 2026

(54) SYNTHESIZING ZERO-LOSS LOW-POWER APPROXIMATE DNN ACCELERATORS WITH LARGE-SCALE SEARCH

(71) Applicant: Google LLC, Mountain View, CA (US)

(72) Inventors: Azalia Mirhoseini, Mountain View, CA (US); Safeen Huda, San Jose, CA (US); Martin Christoph Maas, Mountain View, CA (US); Paras Jagdish Jain, Cupertino, CA (US); Jeffrey Adgate Dean, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 1064 days.

(21) Appl. No.: 17/532,572

(22) Filed: Nov. 22, 2021

(65) Prior Publication Data

US 2023/0162010 A1     May 25, 2023

(51) Int. Cl.
*G06F 15/80* (2006.01)
*G06F 11/30* (2006.01)
*G06F 11/34* (2006.01)
*G06N 3/063* (2023.01)

(52) U.S. Cl.
CPC ...... *G06F 15/8046* (2013.01); *G06F 11/3024* (2013.01); *G06F 11/3062* (2013.01); *G06F 11/3409* (2013.01); *G06N 3/063* (2013.01)

(58) Field of Classification Search
CPC ............. G06F 15/8046; G06F 11/3024; G06F 11/3062; G06F 11/3409; G06N 3/063
See application file for complete search history.

(56) References Cited

U.S. PATENT DOCUMENTS

| 9,626,165 | B1 * | 4/2017 | Ni | G06F 30/343 |
| 11,475,101 | B2 * | 10/2022 | Catthoor | G06N 3/063 |
| 11,580,393 | B2 * | 2/2023 | Kwon | G06N 3/082 |
| 11,972,545 | B2 * | 4/2024 | Yao | G06N 3/02 |

(Continued)

FOREIGN PATENT DOCUMENTS

WO    WO-2019164237 A1 *  8/2019  ............... G06N 3/04

OTHER PUBLICATIONS

Elangovan et al. Ax-BxP: Approximate Blocked Computation for Precision-Reconfigurable Deep Neural Network Acceleration. arxiv.org, Cornell University Library, 201 Olin Library Cornell University Ithaca, NY 14853, Oct. 28, 2021 (Oct. 28, 2021), 20 pages.

(Continued)

*Primary Examiner* — Cheng Yuan Tseng
(74) *Attorney, Agent, or Firm* — Lerner David LLP (57) ABSTRACT

Systems and methods are provided for designing approximate, low-power deep learning accelerator chips that have little to no accuracy loss when executing a deep learning model. A set of approximate systolic arrays may be generated. The performance of each approximate systolic array in the set of approximate systolic arrays processing a deep neural network (DNN) may be determined. Each layer in the DNN may be mapped to an approximate systolic array in the set of approximate systolic arrays. A subset of the set of approximate systolic arrays may be selected for inclusion in the inference chip design based on the mapping and the performance of each approximate systolic array in the set of approximate systolic arrays.

16 Claims, 6 Drawing Sheets

(56) References Cited

U.S. PATENT DOCUMENTS

| | | | | |
|---|---|---|---|---|
| 12,124,533 | B2* | 10/2024 | Yao | G06N 3/084 |
| 12,205,217 | B2* | 1/2025 | Rohmetra | G06T 19/20 |
| 2003/0018675 | A1* | 1/2003 | Asai | G06F 15/8046 |
| | | | | 708/322 |
| 2019/0164043 | A1 | 5/2019 | Litvak et al. | |
| 2020/0151019 | A1* | 5/2020 | Yu | G06F 9/5027 |
| 2022/0284272 | A1* | 9/2022 | Su | G06F 30/327 |
| 2022/0284302 | A1* | 9/2022 | Yoo | G06N 3/045 |
| 2023/0004775 | A1* | 1/2023 | Bourge | G06N 3/105 |

OTHER PUBLICATIONS

Chen et al. You Only Search Once: A Fast Automation Framework for Single-Stage DNN/Accelerator Co-design. arxiv.org, Cornell University Library, 201 Olin Library Cornell University Ithaca, NY 14853, May 14, 2020 (May 14, 2020), 6 pages.

Hammad et al. CNN Inference Using a Preprocessing Precision Controller and Approximate Multipliers With various Precisions. IEEE Access, IEEE, USA, vol. 9, Jan. 5, 2021 (Jan. 5, 2021), pp. 7220-7232.

Zhang et al. ThUnderVolt: Enabling Aggressive Voltage Underscaling and Timing Error Resilience for Energy Efficient Deep Neural Network Accelerators. arxiv.org, Cornell University Library, 201 Olin Library Cornell University Ithaca, NY 14853, Feb. 11, 2018 (Feb. 11, 2018), 7 pages.

Huang et al. An Energy-Efficient Approximate Systolic Array Based on Timing Error Prediction and Prevention. 2021 IEEE 39th VLSI Test Symposium (VTS), IEEE, Apr. 25, 2021 (Apr. 25, 2021), pp. 1-7.

Reagen et al. A Case for Efficient Accelerator Design Space Exploration via Bayesian Optimization. 2017 IEEE/ACM International Symposium on Low Power Electronics and Design (ISLPED), IEEE, Jul. 24, 2017 (Jul. 24, 2017), pp. 1-6.

Wu et al. Special Session: When Dataflows Converge: Reconfigurable and Approximate Computing for Emerging Neural Networks. 2021 IEEE 39th International Conference on Computer Design (ICCD), IEEE, Oct. 24, 2021 (Oct. 24, 2021), pp. 9-12.

International Search Report and Written Opinion for International Application No. PCT/US2022/048055 dated Feb. 23, 2023. 15 pages.

Office Action for Japanese Patent Application No. 2023-571641 dated May 20, 2025. 5 pages.

* cited by examiner

SYNTHESIZING ZERO-LOSS LOW-POWER APPROXIMATE DNN ACCELERATORS WITH LARGE-SCALE SEARCH

BACKGROUND

Scaling neural network models often increases the accuracy of the outputs provided by these neural network models. However, as the size of these neural network models continues to grow, the amount of energy consumed by inference accelerators implementing these deep neural network models also increases. Thus, even minor efficiency improvements in deep learning neural network models may drastically reduce global energy consumption by the inference accelerators implementing the deep learning models.

Arithmetic units that perform basic mathematical operations when implementing a deep learning model are often responsible for most of the energy consumed by the inference accelerators. Full-precision floating-point calculations may be replaced with low-bit precision quantized operations to improve the power efficiency of these arithmetic units. However, the improved efficiency of low-bit quantization may result in degraded accuracy of outputs by the deep learning model. In some instances, a model weight adjustment may be made to recover lost accuracy from approximation. However, this weight adjustment step may not be sufficient to avoid an accuracy degradation.

Further efforts to reduce energy consumption by inference accelerators implementing deep learning models include using approximate units that are more power-efficient than quantized operators. These approximate units may implement approximate operators (e.g., multipliers and adders) that tailor approximations to a numerical distribution observed during neural network evaluation. By tailoring the approximations to a particular application during evaluation, better power to accuracy trade-offs may be incurred than when quantization is uniformly approximated across all inputs. However, errors introduced by approximate units may be compounded as the deep learning model proceeds through each subsequent neural network layer, leading to inaccurate outputs.

BRIEF SUMMARY

The technology described herein is directed to generating an inference chip designs for production. One aspect of the disclosure is directed to a method for generating an inference chip. The method may include, generating, by one or more processors, a set of approximate systolic arrays; determining by the one or more processors, the performance of each approximate systolic array in the set of approximate systolic arrays processing a deep neural network (DNN); mapping, by the one or more processors, each layer in the DNN to an approximate systolic array in the set of approximate systolic arrays; and selecting, for inclusion in the inference chip design, by the one or more processors, a subset of the set of approximate systolic arrays based on the mapping and the performance of each approximate systolic array in the set of approximate systolic arrays.

Another aspect of the disclosure is directed to a system for generating an inference chip design for production. The system may include one or more processors; and memory storing instructions, the instructions, when executed by the one or more processors, causing the one or more processors to: generate a set of approximate systolic arrays; determine the performance of each approximate systolic array in the set of approximate systolic arrays processing a deep neural network (DNN); map each layer in the DNN to an approximate systolic array in the set of approximate systolic arrays; and select, for inclusion in the inference chip design, a subset of the set of approximate systolic arrays based on the mapping and the performance of each approximate systolic array in the set of approximate systolic arrays.

In some instances, a second set of approximate systolic arrays may be generated; the performance of each approximate systolic array in the second set of approximate systolic arrays processing the DNN may be determined; each layer in the DNN to an approximate systolic array in the second set of approximate systolic arrays may be mapped; and the subset of systolic arrays may be updated based on the mapping and the performance of each approximate systolic array in the second set of approximate systolic arrays, wherein the updated subset of approximate systolic arrays includes at least one systolic array from the second set of approximate systolic arrays.

In some instances, the set of approximate systolic arrays is generated to satisfy an architectural template, wherein the architectural template defines a number and/or a size of systolic arrays for the inference chip design. In some examples, each approximate systolic array in the set of approximate systolic arrays are generated using predefined multiply-accumulate units (MACs), the predefined MACs being stored in a bank.

In some instances, each approximate systolic array in the set of approximate systolic arrays are generated using multiply-accumulate units (MACs), wherein the at least one of the MACs are generated based on predefined criteria. In some examples, the predefined criteria includes one or more of power usage or accuracy.

In some instances, determining the performance of each approximate systolic array includes determining the power usage of each approximate systolic array. In some examples, determining the performance of each approximate systolic array further includes determining the accuracy of each approximate systolic array.

In some instances, mapping each layer in the DNN to an approximate systolic array in the set of approximate systolic arrays includes: for each layer in the DNN, configuring a router in the inference chip design, to a particular approximate systolic array in the subset of approximate systolic array based on the power usage and the accuracy of each approximate systolic array.

In some instances, the inference chip design includes at least one full-precision systolic array.

DETAILED DESCRIPTION

The technology described herein is directed to designing approximate, low-power deep learning accelerator chips that have little to no accuracy loss when executing a deep learning model. Further, the approximate, low-power deep learning accelerator chips ("inference chips") described herein do not require the deep learning model to be retrained to maintain accuracy. Instead, the inference chips are designed to process a deep learning model with the same, or nearly the same, accuracy as a chip constructed from "exact" units (e.g., arithmetic units capable of full-precision calculations).

The inference chips may be designed using an architectural template. The template may generate a diverse set of efficient designs with a reconfigurable routing array to a bank of systolic arrays containing approximate units, such as approximate adders and/or approximate multipliers. At runtime, this enables dynamic routing of error-tolerant layers within the deep learning model to more approximate units within the inference chip accelerator, yielding significant power savings. In addition, more error-sensitive layers within the deep learning model may be evaluated on more accurate approximate units and/or exact units to minimize or otherwise avoid introducing errors. Power savings may be achieved without reducing accuracy by co-designing the approximate units on an inference chip with the software mapping of layers within the deep learning model to systolic arrays.

Figure 1:
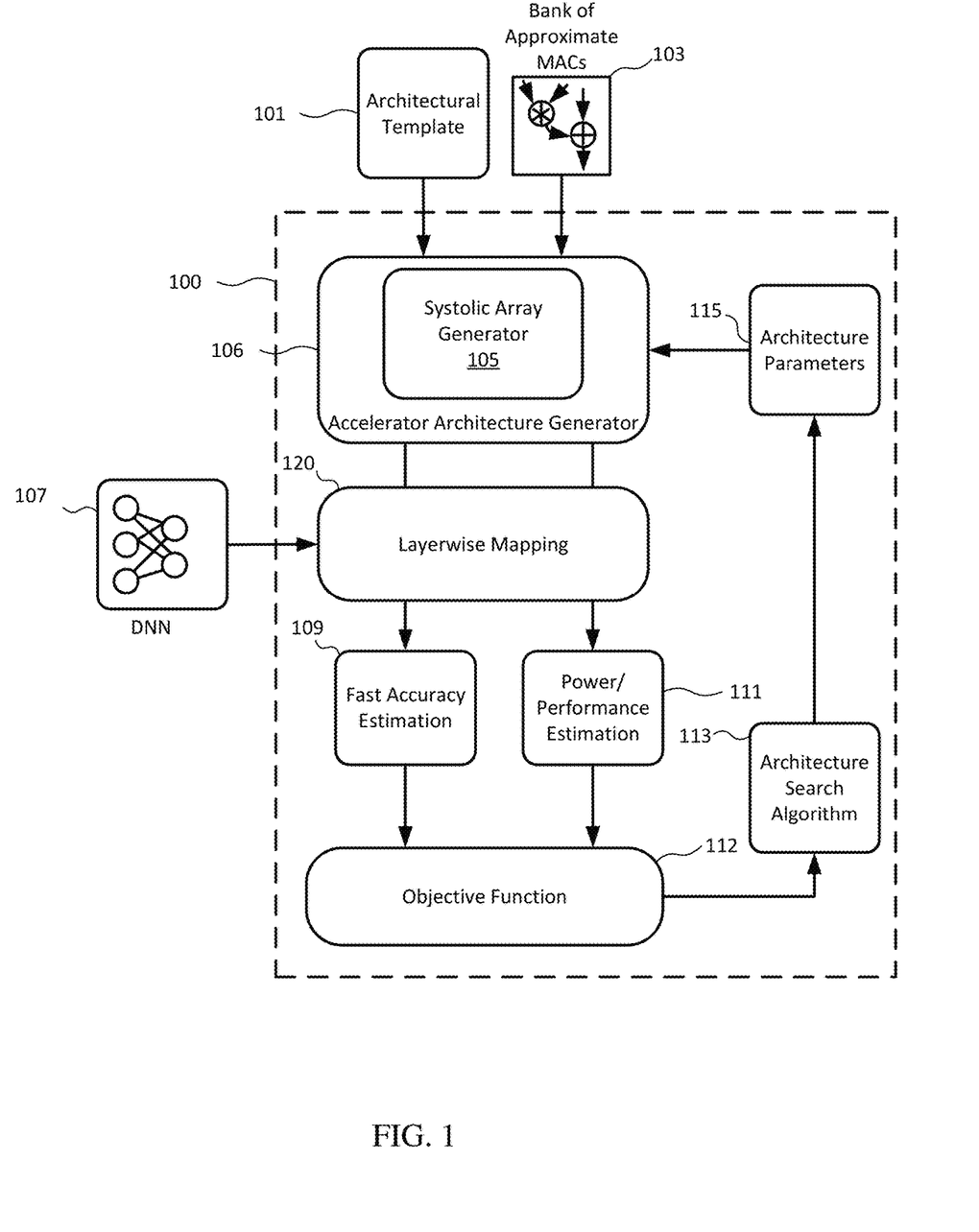
FIG. 1 is a block diagram of an example framework for generating optimized inference chips, according to aspects of the disclosure.

FIG. 1 illustrates a flow diagram showing the design process for creating a low-power, high-accuracy inference chip. As described herein, the task of selecting approximate multiply-accumulate approximate units for an inference chip design occurs concurrently with mapping DNN layers onto the chip's systolic arrays, which include a collection of processing elements (PEs).

Each systolic array may include a two-dimensional array of PEs, with each PE containing one or more multiply-accumulate units (MACs). Additionally, each PE may include buffers for input operands and output results. Each systolic array may be globally activated, and parameter memory may be shared across all systolic arrays. Typically, each systolic array includes a single type of MAC, although some systolic arrays may include more than one type of MAC. Moreover, although MACs are discussed in the examples described herein, other arithmetic units may also be used (e.g., adders.) By designing the hardware and mapping DNN layers to the systolic arrays concurrently, the inference chip may be custom-tailored to a particular class of neural networks.

The flow diagram illustrates an inference chip design framework 100 for generating systolic arrays of approximate and/or exact units that satisfy a given architectural template 101 and architecture parameters 115 input into an accelerator architecture generator 106, that includes a systolic array generator 105. The architectural template 101 of framework 100 may define requirements corresponding to the layout and configuration of an inference chip. For instance, the architectural template 101 may define the number of systolic arrays and the sizes of the systolic arrays for the inference chip. For example, the architectural template may define that the inference chip is to have three systolic arrays, with two being constructed from approximate units and one being constructed from exact units. In other templates, other amounts and types of arrays may be defined, which approximate units (e.g., MACs) to use, etc. The architecture parameters 115 may include the composition of the heterogeneous systolic arrays, memory and system parameters, etc. For the initial process by the framework 100, the architecture parameters may be "seeded." Seeded parameters may be predefined or input each time the framework begins a process.

The MACs that may be used to create the processing elements in the systolic arrays may be stored in a bank 103 of the framework. The MACs may have attributes that satisfy certain criteria, such as error tolerance and power usage. For instance, a first MAC may have attributes such as 1% error relative to an exact MAC and 99% power usage relative to an exact MAC. In another example, a second MAC may have a 3% error relative to an exact MAC and 90% power usage relative to an exact MAC. Bank 103 may store any number of configured MACs, including, in some instances, exact MACs that perform full-precision calculations (not approximate calculations). In some instances, MACs may be generated by the framework. In this regard, the framework may generate a MAC to fit a particular use-case, such as a MAC with a particular error percentage and power usage. During generation of the systolic arrays, the framework may generate a MAC to fit a particular use-case not satisfied by a predefined MAC stored in the bank 103.

The systolic array generator 105 of the accelerator architecture generator 106 may generate a diverse set of systolic arrays using the MACs stored in bank 103 to satisfy the requirements of the given architectural template (and architecture parameters 115) while assuring the set of systolic arrays can accurately execute the DNN 107. In this regard, the accelerator architecture generator 106 may receive the architectural template 101 and architecture parameters 115. The accelerator architecture generator 106 may then provide the systolic array generator with some or all of the received data. For example, the accelerator architecture generator 106 may inform the systolic array generator 105 of the parameters of the design of the systolic arrays, such as the size of the systolic arrays, the composition (e.g. inference chip contains x % MACx, y % MACy,) etc. MACx and MACy may be selected from the bank 103.

The systolic array generator 105 may generate a set of systolic arrays according to the parameters received. In this regard, the systolic array generator 105 of the framework may select MACs with varying accuracy and power attributes according to the received parameters. The systolic array generator 105 may generate code representative of the systolic arrays, such as in Verilog, C++, or other such language.

Each layer of the DNN 107 may be input into the layerwise mapping 120 function of the framework 100. The layerwise mapping 120 function may assign each layer of the DNN 107 to a particular systolic array of the set of systolic arrays generated by the systolic array generator 105. As described herein, the optimal approximation level for processing a DNN may change dramatically between different layers of a deep neural network. The layerwise mapping function 120 may map each DNN level based on its approximation tolerance.

As described herein, the power and accuracy of each generated set of systolic arrays may be tested, and an optimal set of systolic arrays selected for an inference chip design custom-tailored to execute the DNN 107. Although DNNs are described herein, the design process for creating a low-power, high-accuracy inference chips may be performed for other types of neural networks. For instance, each set of generated systolic arrays may be tested for accuracy using fast accuracy estimation 109, described herein. Additionally, the power and performance estimations (collectively "performance estimations) for each set of generated systolic arrays may be determined, as shown by block 111, and as described herein.

The accuracy and performance estimations may be input into an objective function 112, described herein to determine an optimized combination of systolic arrays. In this regard, the objective function 112 may evaluates how good the mapping of each DNN layer is from an accuracy and performance perspective.

The architecture search algorithm 113 may then take the results of the objective function (as well as other previous results of the objective function) and determine whether improvements can be made with different sets of systolic arrays. In this regard, the architecture search algorithm 113 may receive the current objective function result for the current parameters and past objective function results for previous parameters. Based on these parameters, the architecture search algorithm 113 may determine the next set of parameters to try (illustrated by the arrow from 113 to 115 in FIG. 1.) The framework 100 aims to find the optimal value of the objective function through an iterative search of the parameter space to yield the optimal configuration.

This process may repeat for a certain number of times, or until all possible combinations of systolic arrays, layerwise mapping, etc., are completed. The most efficient and accurate set of systolic arrays may then be selected. Although not illustrated, the framework may output design plans for constructing an inference chip according to the selected set of systolic arrays.

Figure 2:
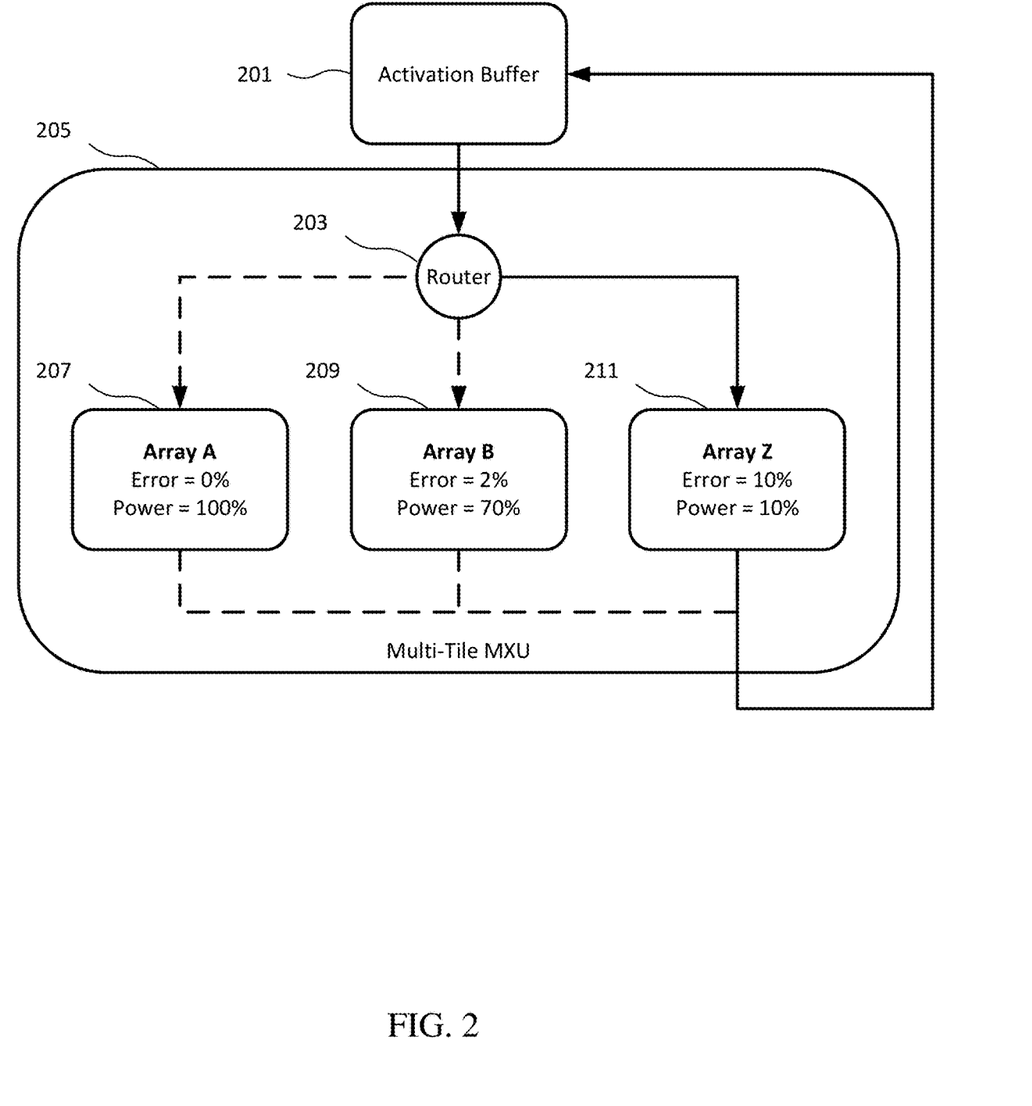
FIG. 2 of an optimized inference chip, according to aspects of the disclosure.

The optimized combination of systolic arrays may make up a multi-tile matrix multiplier unit (MXU). Each "tile" of the multi-tile MXU may include a systolic array with particular accuracy and power attribute. For example, FIG. 2 illustrates a multi-tile MXU 205 that includes three systolic arrays, including Array A 207, Array B 209, and Array Z, 211. Although MXU 205 is shown as including only three arrays, an MXU may include any number of systolic arrays. As further shown in FIG. 2, the activation buffer 201 may receive the results of a previous layer of the DNN. These previous results may then be routed by learned router 203 to a systolic array for processing the next layer of the DNN. The routing of the layers may be pre-programmed such that the router directs particular layers of the DNN to predefined systolic arrays for processing. For example, FIG. 2 shows the current DNN layer being processed by Array Z 211.

Accuracy Estimation

Both training and inference of large-scale deep neural networks may entail trillions of arithmetic operations. With exact arithmetic and standard datatypes, this evaluation can be parallelized on high-throughput GPUs. However, for simulating inexact arithmetic with approximate MACs, direct evaluation of the inexact arithmetic operations may be difficult as existing hardware does not support such operations. For instance, direct evaluation of an approximate MAC with a circuit simulator, such as the Verilator circuit simulator, performing a single exact 8-bit multiplication may take 3.75±0.95 microseconds on a high-performance server. Thus, evaluation of a large neural network, such as ResNet-50, which is 50 layers deep, may take around 4.2 hours at 4 GFLOPs per 224×224 frame. For the entire ImageNet validation set, evaluating a single approximate multiplier would take around 23 years.

Furthermore, while calls may be cached, a full $2^{N+N}$ look-up table for an N-bit multiplier may not scale to wide bit-widths. For instance, with 16-bit inputs, the look-up table would exceed 16 gigabytes. Given the large size, the use of GPU acceleration would be precluded.

Figure 3:
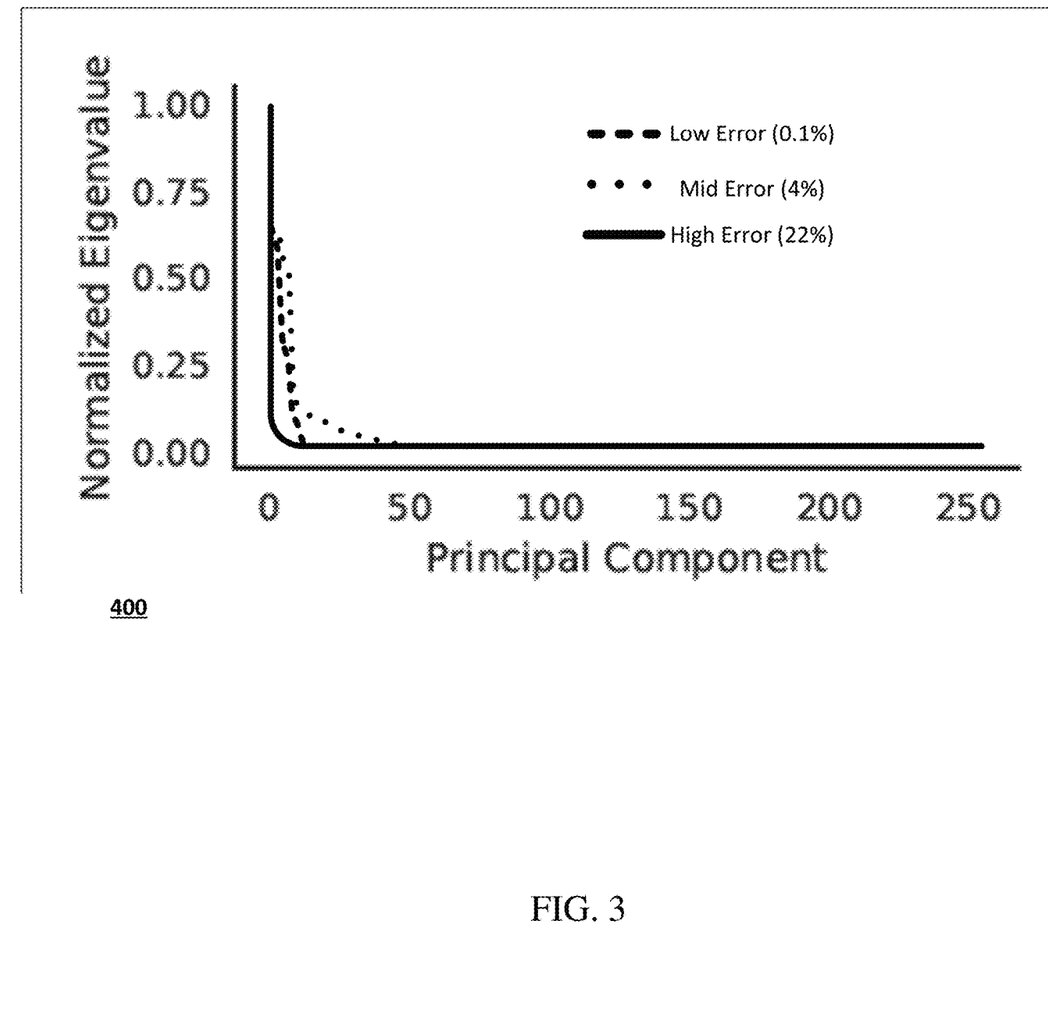
FIG. 3 is a graph illustrating the principal components for various MACs, in accordance with aspects of the disclosure.

To address these issues, the look-up table may be compressed without meaningful error using matrix decomposition. FIG. 3 illustrates the principal components for various MACs, including a MAC with a low error level, a MAC with a mid-error level, and a MAC with a high error level relative to a normalized eigenvalue. As can be seen, minimal errors are introduced with compression. To compress the look-up table (LUT), the LUT is precomputed in memory. A low-rank eigen decomposition may then be computed. An approximation error matrix $\epsilon_{i,j}=\tilde{m}(i,j)-i \times j$ where $\tilde{m}$ is an approximate multiplier, and i and j are indexes of the matrix.

In order to save memory when storing the N-bit error matrix $\epsilon \in R^{2N+N}$ a truncated singular value decomposition may be computed with $k \ll 2^N$ using the following formula (1):

$$\epsilon \approx \Sigma_{i=1}^{k} \sigma_i u_i v^*_i \qquad (1)$$

with total memory consumption of O(nk), down from $O(n^2)$. Within formula (1), $\Sigma$ is the error matrix, $\sigma_i$ is the ith eigenvalue of the error matrix, and $u_i$ and $v_i$ are the ith left-singular vector and right-singular vector of the error matrix, respectively. The parameter $k \ll 2^N$ control the amount of approximation, with a smaller k increasing the approximation but reducing the memory usage for storing the error matrix. With a small k≤50, the total memory consumption may be under 20 MB. During the evaluation, the result of the approximate multiplication of i×j may be recomputed.

All results may be evaluated using a classification dataset, such as a large scale image dataset, such as the ImageNet 2012 dataset. To increase the evaluation speed of an end-to-end model on a target dataset, a small sample, such as a 10% sample, of the full validation set may be evaluated. For example, when using ImageNet 2012, a sample of 5000 images may be used. Ranking models on a sampled validation set typically correlates with performance on the full dataset.

Overall, the optimization described herein may result in a 7200× speedup over direct circuit simulation in Verilator. This strategy also makes GPU evaluation feasible with future potential for automatic retraining. Compressing look-up tables with a low-rank decomposition enables the model evaluation described herein to scale to circuits at wider bit-widths.

Moreover, the approaches described herein are complementary with other known quantization methods. For instance, dynamic range post-training quantization where weights are statically quantized to eight-bits prior to inference may be performed. During inference, activations may be scaled to the uint8 range of [0; 255] and then quantized, although other ranges may be used. Dequantization may then be performed using the following formula (2):

$$q_3^{(i,k)}=Z_3+MNZ_1Z_2-MZ_1\Sigma_{j=1}^{N}q_2^{(j,k)}-MZ_2\Sigma_{j=1}^{N}q_1^{(i,j)}+ M\Sigma_{j=1}^{N}q_1^{(i,j)}q_2^{(j,k)} \qquad (2)$$

where q1 represents the weight matrix, q2 represents the activation matrix, and Z represents respective zero points. Higher power-savings could be accomplished with a more advanced quantization method utilizing quantization-aware training.

Performance Estimation

Figure 4:
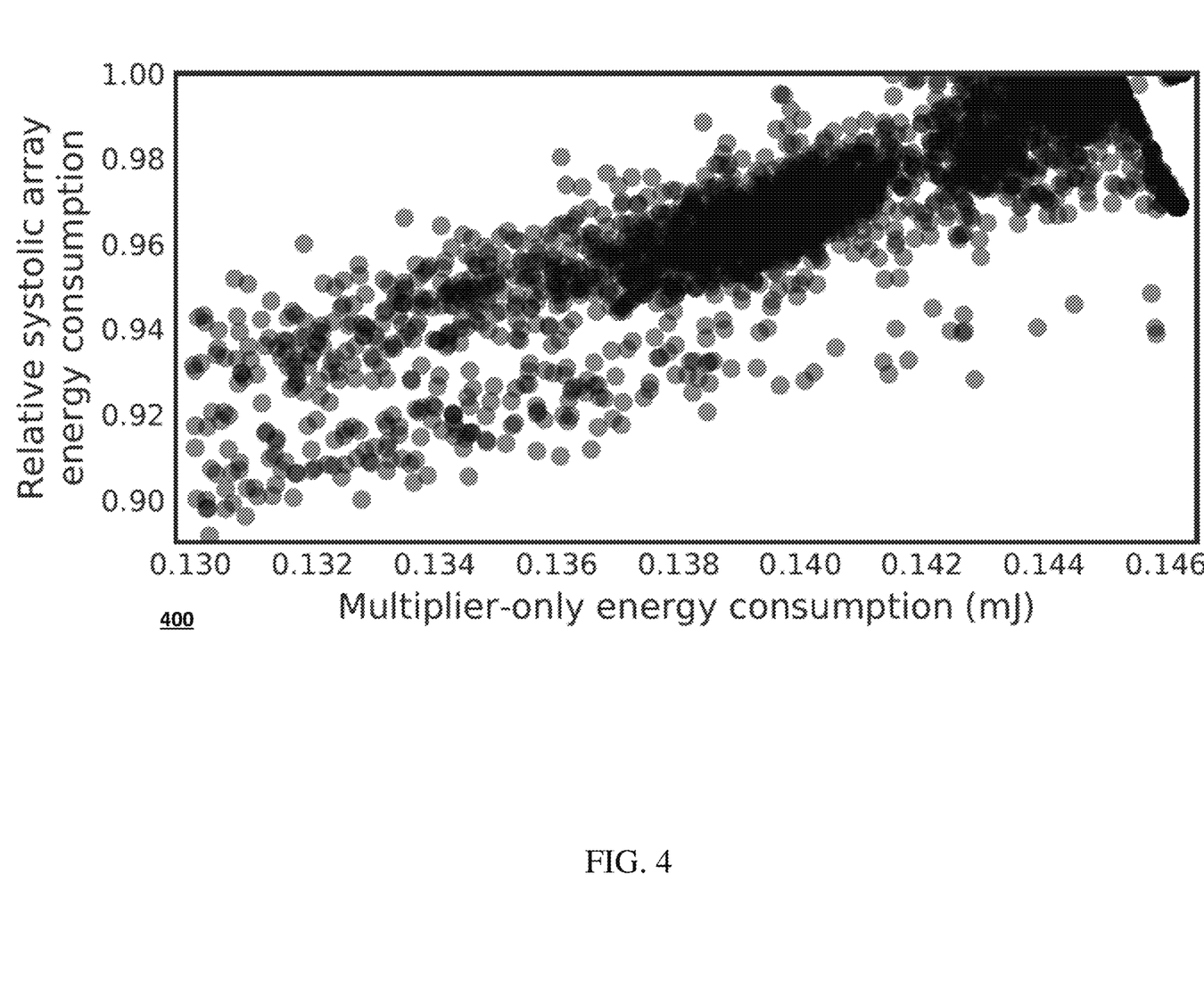
FIG. 4 is a graph illustrating power consumption of a single MAC and systolic arrays, according to aspects of the disclosure.

When considering performance metrics, such as power consumption, prior work considers the performance of a single MAC. However, constructing a systolic array from low power MACs may not result in a lower power systolic array. Such cases are illustrated in FIG. 4, where low power MACs, when implemented in a systolic array, may use higher power levels. This may be due to the impact of MAC area on interconnect power. In this regard, as area A increases, interconnect wire power must increase by $O(\sqrt{A})$.

To evaluate performance of systolic arrays across an MXU, semiconductor design and testing software may be used. The testing may be capable of evaluation of semiconductor designs at sub-10 nm processes. For evaluation, a single clock domain may be applied across each systolic array, with the clock frequency being dictated by the slowest systolic array. In this regard, the clock frequency is typically based on the "exact" systolic array, other "approximate" systolic arrays may be slower and therefore be used to set the clock frequency. Further, although this example describes a single clock frequency, some or all systolic arrays in a design of an MXU may be tested at different frequencies. During synthesis, the different MXU variants are constrained to the slowest clock frequency—this enables some power and area savings as the synthesis tool is able to select smaller gate sizes for the approximate MXU variants which have higher intrinsic performance.

Figure 5:
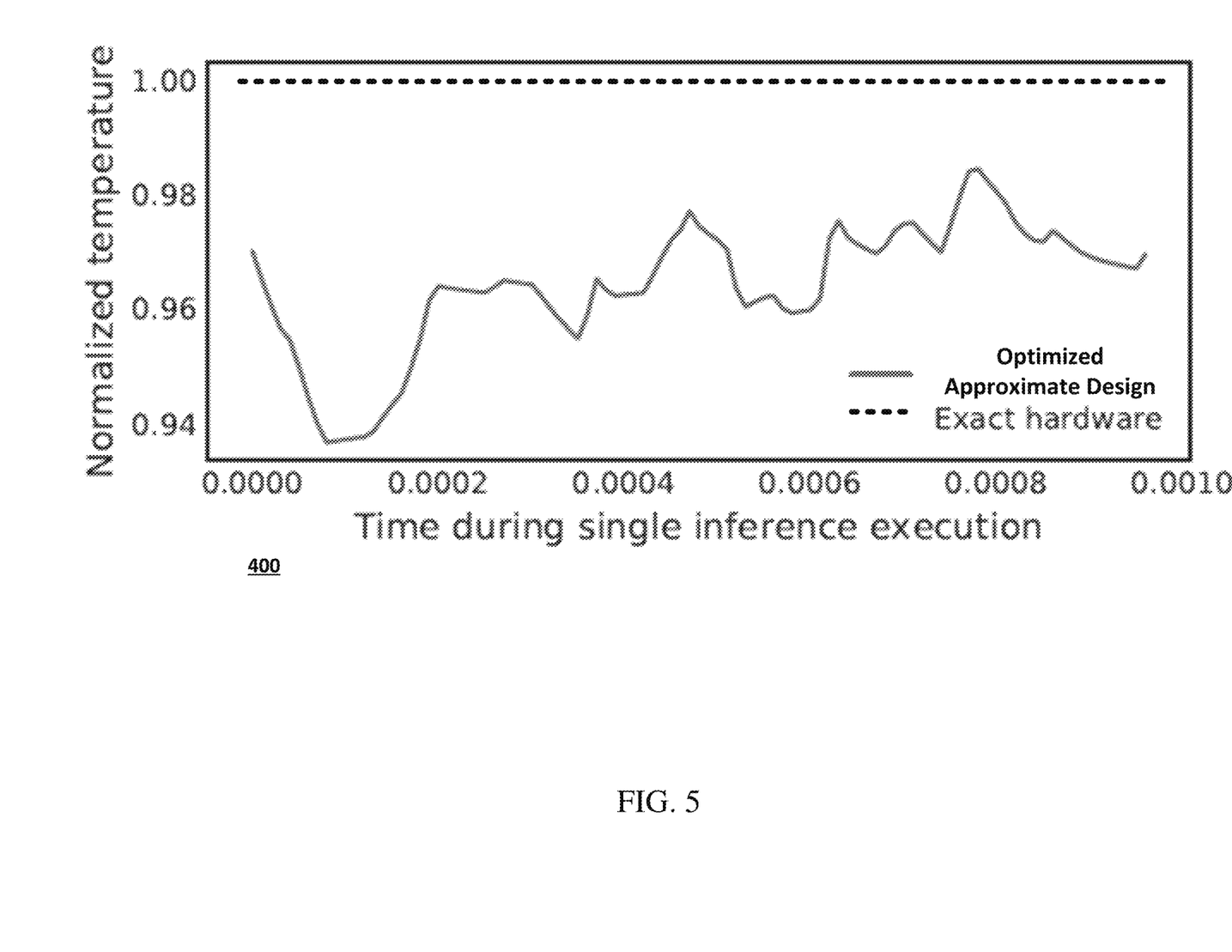
FIG. 5 is a graph illustrating the operating temperature of an optimized MXU including a collection of approximate systolic arrays relative to an MXU formed from exact systolic arrays, in accordance with aspects of the technology.

In practice, DNN accelerators are typically thermal design power (TDP) limited, rather than delay limited. Thus, further gains may be possible by overclocking an inference chip using the thermal savings from the approximate systolic arrays. For example, FIG. 5 illustrates that an optimized approximate MXU operates at a significantly reduced temperature relative to an MXU with only an "exact" systolic array.

Circuit Search and Layer Mapping

Formulization of the Approximate Circuit Mapping Problem

The performance of a particular design also depends on how the convolution loop nest is mapped onto the array. Mapping DNN layers to particular systolic arrays ensures that generated accelerators match what would happen post-synthesis.

In order to preserve high end-to-end task accuracy, consideration of which layers of the deep learning model are approximation tolerant should be made. In this regard, the optimal approximation level may change dramatically between different layers of a deep neural network. However, jointly considering the task of selecting approximate systolic arrays for a chip design concurrently with the mapping of layers of a DNN onto the systolic arrays is challenging. In this regard, each of these two subproblems—selecting approximate units for the chip design and mapping the layers of the DNN onto the approximate units—are each challenging combinatorial optimization problems. Together, they represent a $O(K^N)$ search space with K candidate MAC designs and N deep neural network layers to map. O is "Big O" notation that expresses the complexity of the search space. Additionally, there may be a large number of workloads, with up to a $2^{268}$ search space, or more or less. In this case, the search space defines the ways an approximate MAC may be designed. The goal of the optimization algorithm is to find optimized designs within this search space. Therefore, random search will not perform well.

Bayesian optimization with Gaussian Process (GP) bandits may be leveraged to efficiently discover high-accuracy yet energy-efficient configurations of cross-layer approximate circuits. This approach improves the sample efficiency of black-box optimization by modelling the unknown reward function $f: x \to y$ with a Gaussian Process.

For formalization of the approximate circuit mapping problem, consider the following optimization problem to find the lowest power mapping of approximate circuits to deep neural network layers:

$$\min_{z} \sum_{i=1}^{N} q_i^T Z_i \tag{2a}$$

$$\text{s.t. } ACC(Z) fu \geq \tau \tag{2b}$$

$$AREA(Z) \leq \phi \tag{2c}$$

$$\sum_{j=1}^{K} Z_{i,j} = 1 \quad \forall i \in \{1, \dots, N\} \tag{2d}$$

$$Z \in \{0, 1\}^{N \times K} \tag{2e}$$

The decision variable $Z_i$ represents a one-hot vector to denote which of the K approximate circuits are mapped to layer i and where j is an index. The objective (2a) models the total energy consumption to evaluate a single forward pass where $q_i \in R_+^K$ represents a vector containing the energy to evaluate layer i for each of the K approximate multipliers. Constraints (2d) and (2e) ensure that $Z_i$ is one-hot and is binary/integral. Constraint (2b) defines a minimum accuracy target for the neural network. Finally, Constraint (2c) constrains the area of the final chip to avoid degenerate solutions with many similar redundant multipliers.

The accuracy oracle "ACC" models the effect of cross-layer interactions from approximations. Given a particular assignment of approximate multipliers to layers, ACC calculates the expected accuracy of the model over a specific dataset. As errors introduced in one layer are compounded through subsequent layers, the accuracy oracle is exceptionally challenging to model. Thus, the accuracy of a model may be made over the validation set.

This reduces the optimization problem to a black-box combinatorial optimization problem and further, Bayesian optimization methods typically fail when applied to the above optimization problem. This is because Bayesian optimization methods demonstrate slow convergence with a performance similar to random search. Further, Bayesian optimization struggles with high dimensional states, discrete structures, and constrained search spaces. Therefore the above optimization problem may be reformulated such that known Bayesian optimization tools may be used.

Calibration of Single-Layer Approximation

To find high-accuracy approximate circuit designs, feasible solutions may be constrained with a minimum validation accuracy threshold in constraint (2b). However, the accuracy oracle "ACC" is not known. Thus, to reduce the complexity of the search space, an offline study may be performed where only approximate multipliers for the target layer are used. All other layers may be evaluated with exact multipliers. This model provides an upper-bound on the expected accuracy from cross-layer approximation. Mappings with exceptionally poor expected accuracy may be pruned.

Continuous Relaxation of State Space

GP bandits are predominantly designed to optimize over discrete search spaces. Bayesian optimization frameworks typically support discrete search spaces by embedding them in a real-valued box. However, this embedding is sample-inefficient as it does not consider the relation between different categorical variables. For example, this solution has the challenge of instability due to quantization error from rounding continuous predicted variables to the nearest feasible points.

To address this issue, an estimate of per-layer accuracy degradation from single layer approximation may be used to compute an ordered set representing the relative ranking of each approximate multiplier. In this regard, the ordering may be defined as the profiled end-to-end accuracy for approximating a single layer k with a particular multiplier. However, direct search with unrounded accuracy results in an unstable relaxed optimization problem. This results from two approximate multipliers which achieve similar accuracy, but have very different power consumption. As such, linear order of multipliers may be relaxed to a partially ordered set where ties within a fixed threshold of accuracy are considered incomparable. A completed linear order may then be resolved by eliminating the least efficient multiplier in each pair of incomparable multipliers with similar accuracy.

This procedure derives a linear order of multipliers for each of the N layers in the neural network. To define distance in the new dimension after mapping, a min-max scaling may be applied to the resulting top-1 accuracy (i.e., high probability) for each multiplier from single layer approximation calibration. Given this new formulation of the search space, the following cost optimization objective may be defined. For each of N layers, a step-wise cost function $Q_i: R \rightarrow R$ may be defined to map a real-valued choice of an approximate multiplier (from 0 to 1) to the energy-consumption for the closest layer, rounding down.

The relaxed optimization problem then becomes:

$$\min_z \sum_{i=1}^{N} Q_i(Z_i) \quad (3a)$$

$$\text{s.t.} \quad ACC(Z) \geq \tau \quad (3b)$$

$$AREA(Z) \leq \phi \quad (3c)$$

$$0 \leq Z \leq 1 \quad (3d)$$

$$Z \in \mathbb{R}^N \quad (3e)$$

Unconstrained Optimization with Barrier Functions

While recent work has begun to explore multi-objective optimization using Bayesian optimization, these approaches are generally significantly less sample-efficient than single-objective optimizers. For optimizing inference chip designs, a two-dimensional pareto frontier between accuracy and energy consumption may be reviewed. In practice, it may be useful to also limit the area of the final systolic array to avoid degenerate solutions where redundant approximate multipliers with similar accuracy are instantiated on a single chip.

The barrier method may be used to remove constraints (3b) and (3c). Barrier methods replace each constraint of form x≤b with a penalty in the objective function β(x, b)=−log(b−x) or β(x; b)=$e^{x-b}$. As x approaches the constraint b, the penalty trends to ∞. Utilizing a barrier method, the objective may be expressed as:

$$\sum_{i=1}^{N} Q_i(Z_i) + \alpha_1 \mathcal{B}(\tau, ACC(Z)) + \alpha_2 \mathcal{B}(AREA(Z), \phi)$$

This updated objective now allows the removal of constraints (3b) and (3c). The exponential barrier function may be leveraged as it allows for soft constraint violations. For the accuracy term, a target accuracy τ may be 0.68, or more or less and weight $\alpha_2$ may be 8, or more or less. For the area term, a target area percentage (including exact multiplier) such as $\phi$=400%, or more or less, and a scale $\alpha_2$ may be 1:2, or more or less.

Example Computing Environments

Figure 6:
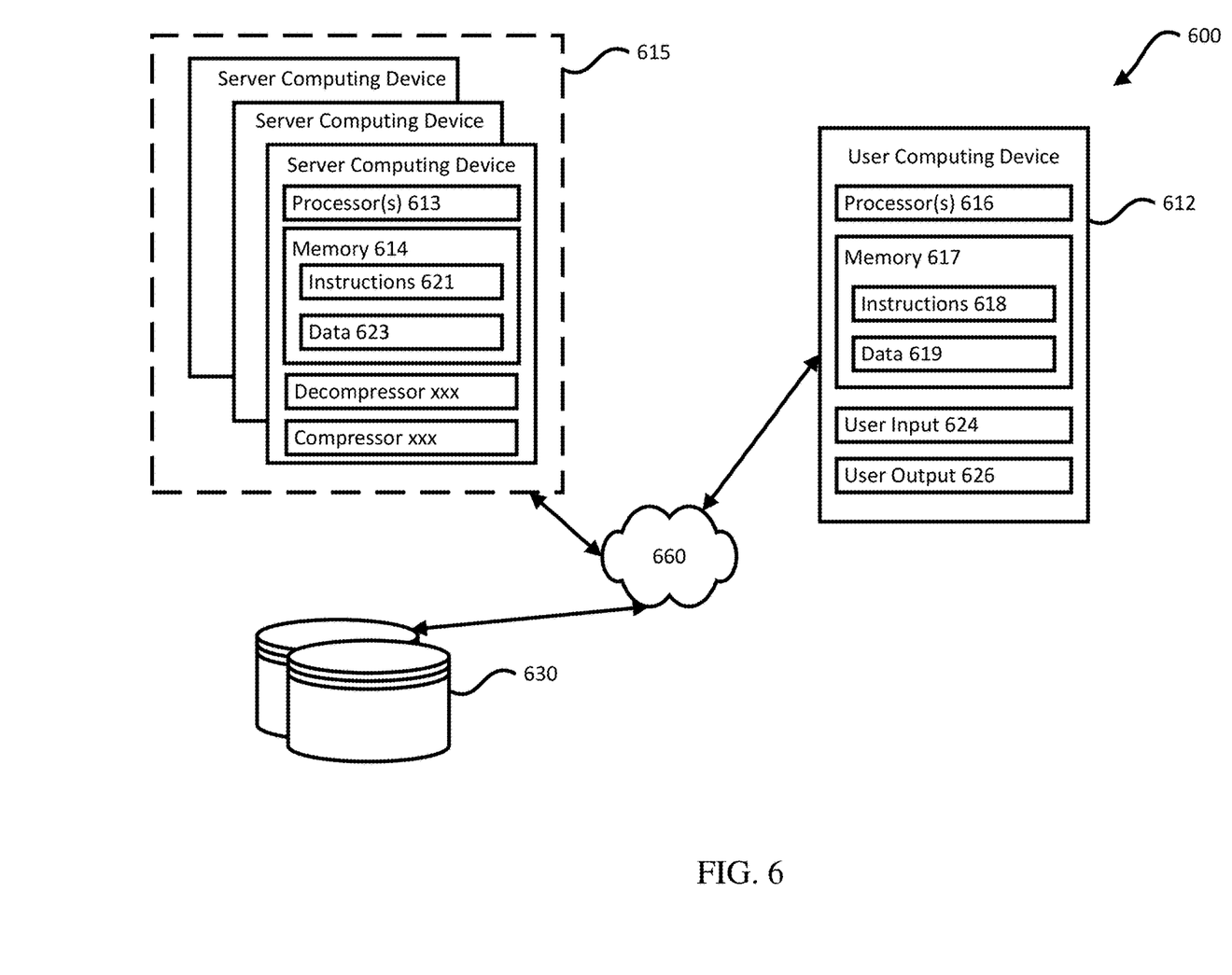
FIG. 6 is a block diagram of an example computing environment implementing the framework, in accordance with aspects of the technology.

FIG. 6 is a block diagram of an example computing environment 600 implementing an example framework as illustrated in FIG. 1. For example, the framework may be implemented on one or more devices having one or more processors in one or more locations, such as in server computing device 615. User computing device 612 and the server computing device 615 can be communicatively coupled to one or more storage devices 630 over a network 660. The storage device(s) 630 can be a combination of volatile and non-volatile memory, and can be at the same or different physical locations than the computing devices 612, 615. For example, the storage device(s) 630 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 615 can include one or more processors 613 and memory 614. The memory 614 can store information accessible by the processor(s) 613, including instructions 621 that can be executed by the processor(s) 613. The memory 614 can also include data 623 that can be retrieved, manipulated or stored by the processor(s) 613. The memory 614 can be a type of non-transitory computer readable medium capable of storing information accessible by the processor(s) 613, such as volatile and non-volatile memory. The processor(s) 613 can include one or more central processing units (CPUs), graphic processing units (GPUs), field-programmable gate arrays (FPGAs), and/or application-specific integrated circuits (ASICs), such as tensor processing units (TPUs).

The instructions 621 can include one or more instructions that when executed by the processor(s) 613, causes the one or more processors to perform actions defined by the instructions. The instructions 621 can be stored in object code format for direct processing by the processor(s) 613, or in other formats including interpretable scripts or collections of independent source code modules that are interpreted on demand or compiled in advance. The instructions 621 can include instructions for implementing the framework 100 consistent with aspects of this disclosure. The framework 100 can be executed using the processor(s) 613, and/or using other processors remotely located from the server computing device 615.

The data 623 can be retrieved, stored, or modified by the processor(s) 613 in accordance with the instructions 621, such as the bank of approximate MACs 103, architectural template 101, architecture parameters 115, etc. The data 623 can be stored in computer registers, in a relational or non-relational database as a table having a plurality of different fields and records, or as JSON, YAML, proto, or XML documents. The data 623 can also be formatted in a computer-readable format such as, but not limited to, binary values, ASCII or Unicode. Moreover, the data 623 can include information sufficient to identify relevant information, such as numbers, descriptive text, proprietary codes, pointers, references to data stored in other memories, including other network locations, or information that is used by a function to calculate relevant data.

The user computing device 612 can also be configured similar to the server computing device 615, with one or more processors 616, memory 617, instructions 618, and data 619. The user computing device 612 can also include a user output 626, and a user input 624. The user input 624 can include any appropriate mechanism or technique for receiving input from a user, such as keyboard, mouse, mechanical actuators, soft actuators, touchscreens, microphones, and sensors.

The server computing device 615 can be configured to transmit data to the user computing device 612, and the user computing device 612 can be configured to display at least a portion of the received data on a display implemented as part of the user output 626. The user output 626 can also be used for displaying an interface between the user computing device 612 and the server computing device 615. The user output 626 can alternatively or additionally include one or more speakers, transducers or other audio outputs, a haptic interface or other tactile feedback that provides non-visual and non-audible information to the platform user of the user computing device 612.

Although FIG. 6 illustrates the processors 613, 616 and the memories 614, 617 as being within the computing devices 615, 612, components described in this specification, including the processors 613, 616 and the memories 614, 617 can include multiple processors and memories that can operate in different physical locations and not within the same computing device. For example, some of the instructions 621, 618 and the data 623, 619 can be stored on a removable SD card and others within a read-only computer chip. Some or all of the instructions and data can be stored in a location physically remote from, yet still accessible by, the processors 613, 616. Similarly, the processors 613, 616 can include a collection of processors that can perform concurrent and/or sequential operation. The computing devices 615, 612 can each include one or more internal clocks providing timing information, which can be used for time measurement for operations and programs run by the computing devices 615, 612.

The server computing device 615 can be configured to receive requests to process data from the user computing device 612. For example, the environment 600 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 612 may receive and transmit data specifying target computing resources to be allocated for executing a neural network trained to perform a particular neural network task.

The devices 612, 615 can be capable of direct and indirect communication over the network 660. The devices 615, 612 can set up listening sockets that may accept an initiating connection for sending and receiving information. The network 660 itself can include various configurations and protocols including the Internet, World Wide Web, intranets, virtual private networks, wide area networks, local networks, and private networks using communication protocols proprietary to one or more companies. The network 660 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 660, in addition or alternatively, can also support wired connections between the devices 612, 615, including over various types of Ethernet connection.

Although a single server computing device 615 and user computing device 612 are shown in FIG. 6, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system, or be part of multiple systems. One or more processors in one or more locations implementing an example STOC according to aspects of the disclosure can perform the operations shown in the drawings and recited in the claims.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only

The invention claimed is:

1. A computer-implemented method for generating an inference chip configuration to execute a neural network, the method comprising:
generating, by one or more processors, a set of approximate systolic arrays to satisfy an architectural template for the inference chip configuration, each approximate systolic array in the set of approximate systolic arrays having a particular power usage and accuracy;
mapping, by the one or more processors, each layer in the neural network to an approximate systolic array in the set of approximate systolic arrays based on the particular power usages and accuracies by configuring a router in the inference chip configuration to assign each layer in the neural network to an approximate systolic array in the set of approximate systolic arrays;
determining, by the one or more processors, a performance of each approximate systolic array mapped in the neural network for processing the neural network, wherein the performance comprises a power usage and accuracy; and
selecting, for inclusion in the inference chip configuration, by the one or more processors, a subset of the set of approximate systolic arrays based on the performances of each approximate systolic array mapped in the neural network.

2. The method of claim 1, wherein selecting the subset of the set of approximate systolic arrays further comprises:
inputting the performances of each approximate systolic array mapped in the neural network to an objective function for determining an optimized combination of systolic arrays;
updating the architectural template for the inference chip configuration based on a result of the objective function;
generating a second set of approximate systolic arrays to satisfy the updated architectural template;
mapping each layer in the neural network to an approximate systolic array in the second set of approximate systolic arrays;
determining a performance of each approximate systolic array in the second set of approximate systolic arrays mapped in the neural network for processing the neural network; and
updating, by the one or more processors, the subset of systolic arrays based on the performances of each approximate systolic arrays in the second set of approximate systolic arrays mapped in the neural network.

3. The method of claim 1, wherein the architectural template defines at least one of a number or a size of systolic arrays for the inference chip configuration.

4. The method of claim 1, wherein each approximate systolic array in the set of approximate systolic arrays is generated using multiply-accumulate units (MACs) that are stored in a bank.

5. The method of claim 4, wherein the MACs are predefined to satisfy predefined criteria.

6. The method of claim 5, wherein the predefined criteria comprises power usage and accuracy.

7. The method of claim 1, wherein the inference chip configuration comprises at least one full-precision systolic array.

8. A system for generating an inference chip configuration to execute a neural network, the system comprising:
one or more processors; and
memory storing instructions that, when executed by the one or more processors, cause the one or more processors to:
generate a set of approximate systolic arrays to satisfy an architectural template for the inference chip configuration, each approximate systolic array in the set of approximate systolic arrays having a particular power usage and accuracy;
map each layer in the neural network to an approximate systolic array in the set of approximate systolic arrays based on the particular power usages and accuracies by configuring a router in the inference chip configuration to assign each layer in the neural network to an approximate systolic array in the set of approximate systolic arrays;
determine a performance of each approximate systolic array mapped in the neural network for processing the neural network, wherein the performance comprises a power usage and accuracy; and
select, for inclusion in the inference chip configuration, a subset of the set of approximate systolic arrays based on the performances of each approximate systolic arrays mapped in the neural network.

9. The system of claim 8, wherein selecting the subset of the set of approximate systolic arrays further comprises:
inputting the performances of each approximate systolic array mapped in the neural network to an objective function for determining an optimized combination of systolic arrays;
updating the architectural template for the inference chip configuration based on a result of the objective function;
generating a second set of approximate systolic arrays to satisfy the updated architectural template;
mapping each layer in the neural network to an approximate systolic array in the second set of approximate systolic arrays;
determining a performance of each approximate systolic array in the second set of approximate systolic arrays mapped in the neural network for processing the neural network; and
updating, by the one or more processors, the subset of systolic arrays based on the performances of each approximate systolic arrays in the second set of approximate systolic arrays mapped in the neural network.

10. The system of claim 8, wherein the architectural template defines at least one of a number or a size of systolic arrays for the inference chip configuration.

11. The system of claim 8, wherein each approximate systolic array in the set of approximate systolic arrays is generated using multiply-accumulate units (MACs) that are stored in a bank.

12. The system of claim 11, wherein the MACs are predefined to satisfy predefined criteria.

13. The system of claim 12, wherein the predefined criteria comprises power usage and accuracy.

14. The system of claim 8, wherein the inference chip configuration comprises at least one full-precision systolic array.

15. A non-transitory computer readable medium for storing instructions for generating an inference chip configuration to execute a neural network that, when executed by one or more processors, cause the one or more processors to:

generate a set of approximate systolic arrays to satisfy an architectural template for the inference chip configuration, each approximate systolic array in the set of approximate systolic arrays having a particular power usage and accuracy;

map each layer in the neural network to an approximate systolic array in the set of approximate systolic arrays based on the particular power usages and accuracies by configuring a router in the inference chip configuration to assign each layer in the neural network to an approximate systolic array in the set of approximate systolic arrays;

determine a performance of each approximate systolic array mapped in the neural network for processing the neural network, wherein the performance comprises a power usage and accuracy; and select, for inclusion in the inference chip configuration, a subset of the set of approximate systolic arrays based on the performances of each approximate systolic array mapped in the neural network.

16. The non-transitory computer readable medium of claim 15, wherein selecting the subset of the set of approximate systolic arrays further comprises:

inputting the performances of each approximate systolic array mapped in the neural network to an objective function for determining an optimized combination of systolic arrays;

updating the architectural template for the inference chip configuration based on a result of the objective function;

generating a second set of approximate systolic arrays to satisfy the updated architectural template;

mapping each layer in the neural network to an approximate systolic array in the second set of approximate systolic arrays;

determining a performance of each approximate systolic array in the second set of approximate systolic arrays mapped in the neural network for processing the neural network; and updating, by the one or more processors, the subset of systolic arrays based on the performances of each approximate systolic arrays in the second set of approximate systolic arrays mapped in the neural network.

* * * * *